United States Patent
Tashiro et al.

(10) Patent No.: US 12,427,653 B2
(45) Date of Patent: Sep. 30, 2025

(54) ROBOT SYSTEM

(71) Applicant: KABUSHIKI KAISHA YASKAWA DENKI, Kitakyushu (JP)

(72) Inventors: Akihiro Tashiro, Kitakyushu (JP); Kyohei Tsuchiya, Kitakyushu (JP); Chengbi Zhao, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 247 days.

(21) Appl. No.: 18/183,160

(22) Filed: Mar. 14, 2023

(65) Prior Publication Data

US 2023/0339100 A1  Oct. 26, 2023

(30) Foreign Application Priority Data

Apr. 21, 2022  (JP) .................................. 2022-069928

(51) Int. Cl.
  *B25J 9/00*  (2006.01)
  *B25J 9/04*  (2006.01)

(52) U.S. Cl.
  CPC ............. *B25J 9/042* (2013.01); *B25J 9/0093* (2013.01)

(58) Field of Classification Search
  CPC ... B25J 9/042; B25J 9/0093; B25J 9/04; B25J 18/00; B25J 9/0009; B65G 47/90
  See application file for complete search history.

(56) References Cited

U.S. PATENT DOCUMENTS

| | | | | |
|---|---|---|---|---|
| 4,850,782 A * | 7/1989 | Focke | .................. | B65G 61/00 414/673 |
| 4,976,584 A * | 12/1990 | Focke | .................. | B65G 61/00 414/789.6 |
| 5,085,556 A * | 2/1992 | Ohtomi | .................. | B25J 9/023 414/744.5 |
| 5,348,440 A * | 9/1994 | Focke | .................. | B65G 61/00 414/793 |
| 5,566,436 A * | 10/1996 | Hirata | .................. | B23P 19/04 29/430 |
| 6,290,448 B1 * | 9/2001 | Focke | .................. | B65G 57/005 198/374 |
| 9,914,601 B2 * | 3/2018 | Morency | .................. | B65G 61/00 |
| 2015/0283569 A1 * | 10/2015 | Linares | .................. | B05B 13/0431 427/427.2 |
| 2021/0094170 A1 * | 4/2021 | Park | .................. | B23P 19/007 |

FOREIGN PATENT DOCUMENTS

JP  H07-214485  8/1995

* cited by examiner

*Primary Examiner* — Victor L MacArthur
(74) *Attorney, Agent, or Firm* — MORI & WARD, LLP

(57) ABSTRACT

A robot system includes a first conveyor conveying a workpiece to a first position in a conveying direction along a transport line, a second conveyor conveying the workpiece from a second position along a first line perpendicular to the transport line, and a robot conveying the workpiece from the first to second positions. The robot includes a base fixed to a fixed position apart from the first line in the conveying direction, and an arm base movably connected to the base. A first arm is connected to the arm base rotatably about a first axis perpendicular to the transport and first lines. A second arm is connected to the first arm rotatably about a second axis parallel to the first axis. An arm tip is connected to the second arm rotatably about a third axis parallel to the first axis. A workpiece holder is provided below the arm tip.

22 Claims, 7 Drawing Sheets

ROBOT SYSTEM

CROSS-REFERENCE TO RELATED APPLICATIONS

The present application claims priority under 35 U.S.C. § 119 to Japanese Patent Application No. 2022-069928, filed Apr. 21, 2022. The contents of this application are incorporated herein by reference in their entirety.

BACKGROUND OF THE INVENTION

Field of the Invention

The present disclosure relates to a robot system.

Discussion of the Background

Japanese Patent Application Laid-Open No. H07-214485 discloses a system which includes a workpiece conveyor apparatus for conveying a workpiece, and a robot for gripping the workpiece conveyed by the workpiece conveyor apparatus and palletizing the workpiece on a pallet.

SUMMARY OF THE INVENTION

According to one aspect of the present invention, a robot system includes a first conveyor configured to convey a workpiece to a first position in a conveying direction along a transport line, a second conveyor configured to convey the workpiece from a second position along a first line perpendicular to the transport line, and a robot configured to convey the workpiece from the first position to the second position. The robot includes a base fixed to a fixed position apart from the first line in the conveying direction, an arm base movably connected to the base to move upwards and downwards along the base, a first arm having a first one end portion and a first another end portion opposite to the first one end portion, a second arm having a second one end portion and a second another end portion opposite to the second one end portion, an arm tip, and a workpiece holder provided below the arm tip and configured to hold the workpiece from above. The first one end portion is connected to the arm base rotatably about a first axis perpendicular to the transport line and the first line. The second one end portion is connected to the first another end portion rotatably about a second axis parallel to the first axis. The arm tip is connected to the second another end portion rotatably about a third axis parallel to the first axis.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
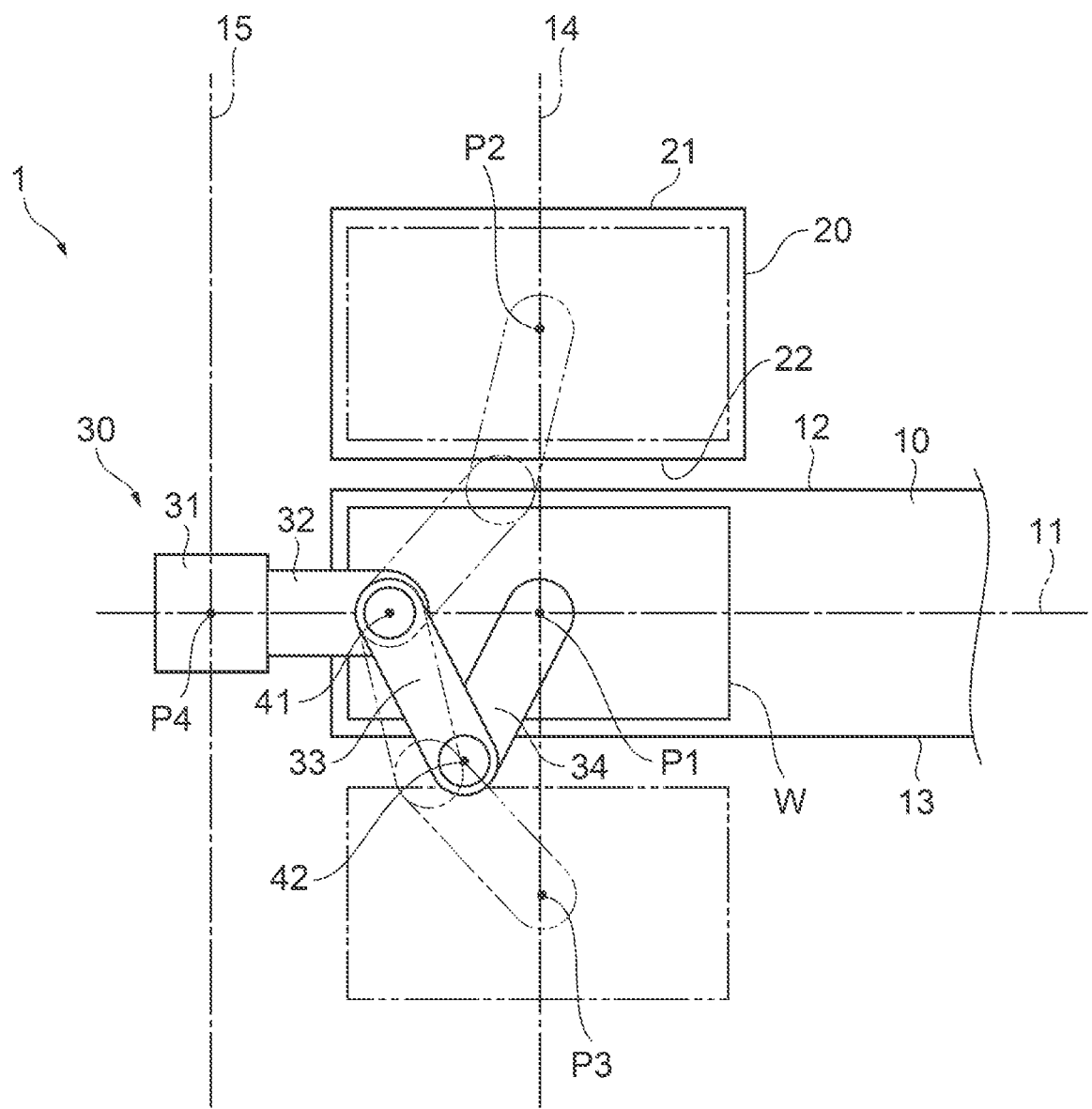
FIG. 1 is a plan view illustrating a configuration of a robot system.

Embodiments will be described in detail below with reference to the drawings. In the description, the same elements or elements having the same function are denoted by the same reference numerals, and duplicated description is omitted.

The robot system according to the present embodiment is a system for conveying a workpiece W. The workpiece W is not particularly limited. The workpiece W may include a battery module for driving the electric vehicle. For example, the workpiece W may be a single battery module, or may be a plurality of battery modules that are collectively transported. The workpiece W may be a battery unit in which a plurality of battery modules is integrated. The weight of the workpiece W may be 300 kg or more.

Figure 2:
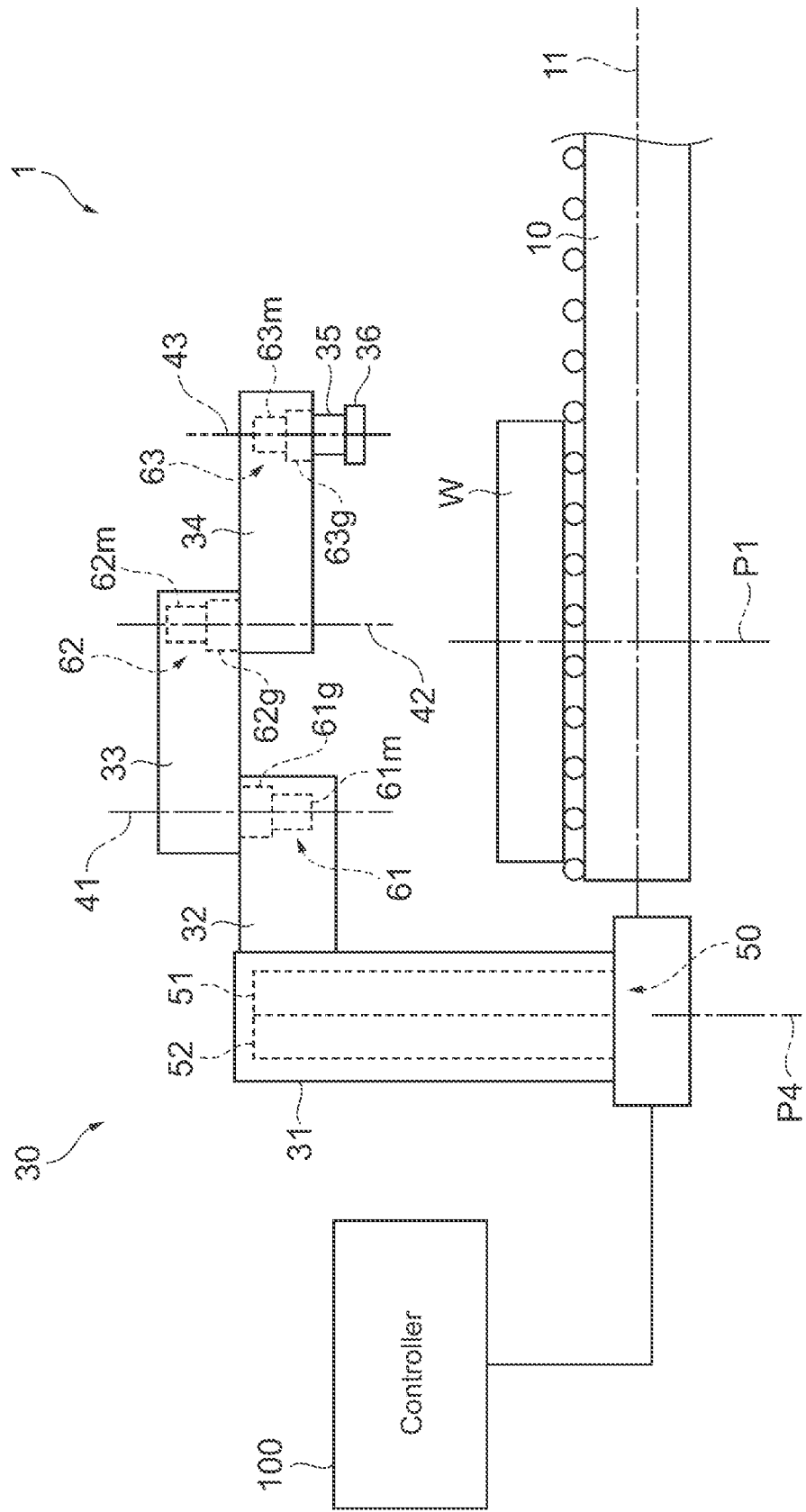
FIG. 2 is a side view of the robot system of FIG. 1.

FIG. 1 is a plan view illustrating a configuration of a robot system. FIG. 2 is a side view of the robot system of FIG. 1. As shown in FIGS. 1 and 2, the robot system 1 includes a first conveyor 10, a second conveyor 20, and a robot 30.

A first conveyor 10 supports a workpiece W and conveys the supported workpiece W to a first position P1 along a horizontal transport line 11. The first conveyor 10 may be a device for conveying the workpiece W without moving the device itself, or a device for conveying the workpiece W by moving the device itself together with the workpiece W. As an example of the first conveyor that conveys the workpiece W without moving the device itself, the first conveyor such as a belt conveyor apparatus or a roller conveyor apparatus can be given. As an example of the first conveyor in which the own apparatus moves together with the workpiece W, an automatic guided vehicle AGV or the like can be given.

Conveying the workpiece W to the first position P1 means that the workpiece W located away from the first position P1 when viewed from above is conveyed until it reaches the first position P1 when viewed from above. The first conveyor 10 may convey the workpiece W until the center of the workpiece W coincides with the first position P1 as viewed from above. Hereinafter, the direction in which the first conveyor 10 conveys the workpiece W toward the first position P1 is referred to as the front side of the transport line 11.

A second conveyor 20 supports a workpiece W at a second position P2 adjacent to a first position P1 along a first line 14 perpendicular to a transport line 11, and conveys the supported workpiece W from the second position P2. For example, the second position P2 is adjacent to the first position P1 when viewed from above. The second conveyor 20 may be a device that conveys the workpiece W without moving the device itself, or a device that conveys the workpiece W by moving the device itself together with the workpiece W. As an example of the second conveyor that conveys the workpiece W without moving the device itself, the second conveyor such as a belt conveyor apparatus or a roller conveyor apparatus can be given. As an example of the second conveyor in which the own apparatus moves together with the workpiece W, an automatic guided vehicle AGV or the like can be given.

Supporting the workpiece W at the second position P2 means supporting the workpiece W in a state where at least a part of the workpiece W is applied to the second position P2 when viewed from above. Conveying the workpiece W from the second position P2 means conveying the workpiece W from a state in which at least a part of the workpiece W is placed on the second position P2 as viewed from above to a position away from the second position P2. The second conveyor 20 may support the workpiece W in a state in which the center of the workpiece W coincides with the second position P2, or may convey the workpiece W from a state in which the center of the workpiece W coincides with the second position P2.

The robot 30 is fixed at a fixed position P4 apart from the first line 14 in the conveying direction of the workpiece W by the first conveyor 10, and conveys the workpiece W from the first position P1 to the second position P2. The fixed position P4 may be adjacent to the first position P1 along the transport line 11, or may be located at a position different from the first position P1 in the direction along the first line 14. In the direction along the transport line 11, the fixed position P4 is positioned outside the first conveyor 10. For example, the fixed position P4 is positioned in front of the first conveyor 10 on the transport line 11 as viewed from above.

The robot 30 receives the workpiece W conveyed by the first conveyor 10 until the workpiece W reaches a first position P1 from the first conveyor 10, conveys the workpiece W until the workpiece W reaches a second position P2, and delivers the workpiece W to the second conveyor 20. For example, the robot 30 holds the workpiece W supported by the first conveyor 10 in a state of being caught by the first position P1, lifts the workpiece W, conveys the workpiece W to be caught by the second position P2, and lowers the workpiece W to be supported by the second conveyor 20. The robot 30 releases the workpiece W after allowing the second conveyor 20 to support the workpiece W. As described above, since the weight of the workpiece W may be 300 kg or more, the portable weight of the robot 30 may be 300 kg or more.

A robot 30 has a base portion (an example of "a base") 31, a first arm 33, a second arm 34, an arm tip portion (an example of "an arm tip") 35, and a workpiece holding portion (an example of "a workpiece holder") 36. The base portion 31 is fixed to a floor surface, a wall surface or the like at a fixed position P4, and lifts and lowers the arm base 32. The arm base 32 protrudes from the base portion 31 toward the rear of the transport line 11. The first arm 33 is connected to the arm base 32 so as to rotate about a first vertical axis 41 perpendicular to the horizontal plane, and extends in a direction away from the first axis 41. For example, the first arm 33 extends along a horizontal line in a direction away from the first axis 41.

The second arm 34 is connected to an end portion of the first arm 33 so as to rotate about the vertical second axis 42, and extends in a direction away from the second axis 42. For example, the second arm 34 extends along a horizontal line in a direction away from the second axis 42.

The arm tip portion 35 is connected to the second arm 34 so as to rotate about a vertical third axis 43. The workpiece holding portion 36 is provided below the arm tip portion 35 and holds the workpiece W from above. The workpiece holding portion 36 may be configured to hold the workpiece W by vacuum suction, or may be configured to grasp the workpiece W by a mechanical hand. In the case where the workpiece W is a plurality of battery modules that are conveyed together, the workpiece holding portion 36 may have a plurality of suction nozzles corresponding to the plurality of battery modules, respectively. Further, the workpiece holding portion 36 may be configured so that a plurality of battery modules can be held together by a mechanical hand.

As described above, in the robot 30 for transferring the workpiece W from the first conveyor 10 to the second conveyor 20, the portion from the arm base 32 to the arm tip portion 35 is a SCARA Selective Compliance Assembly Robot Arm type. Therefore, the moment due to gravity can be suppressed and the first arm 33, the second arm 34, and the arm tip portion 35 can be driven with high efficiency. Hereinafter, the portion from the arm base 32 to the arm tip portion 35 is referred to as a "scalar portion". According to the configuration in which the arm base 32 is lifted and lowered, it is not necessary to arrange an actuator for lifting and lowering in the first arm 33, the second arm 34, and the arm tip portion 35, so that the weight of the scalar portion can be reduced. Further, according to the configuration in which the arm base 32 is lifted and lowered without rotating, the region occupied by the scalar portion by the rotating operation can be reduced as compared with the configuration in which the entire scalar portion is rotated. Thus, the first arm 33, the second arm 34, and the arm tip portion 35 can be driven with higher efficiency. Since the scalar portion is raised and lowered together with the workpiece W, the load for lifting and lowering becomes large, but the load for lifting and lowering can be appropriately reduced by utilizing gravity, gas pressure, or the like. With a configuration in which a workpiece W is conveyed from a first position P1 to a second position P2 by a robot 30 fixed to a fixed position P4 separated from a first line 14 in the direction of conveyance of the workpiece W by a first conveyor 10, a conveying stroke from the first position P1 to the second position P2 can be ensured while the lengths of the first arm 33 and the second arm 34 are kept short. Therefore, the first arm 33, the second arm 34, and the arm tip portion 35 can be driven at a higher efficiency. Therefore, the robot system 1 is effective in conveying the workpiece W with high efficiency.

The robot 30 may be configured so as to be able to convey the workpiece W to a third position P3 adjacent to the first position P1 in a direction opposite to the direction in which the second position P2 is disposed with respect to the first position P1. The second position P2, the first position P1, and the third position P3 are arranged in order along the first line 14. In this case, the robot 30 can also be effectively used for transportation from the first position P1 to the third position P3.

When viewed from above, the first conveyor 10 may have a first side edge 12 and a second side edge 13 along the transport line 11, and at least a part of the base portion 31 may be positioned between the first side edge 12 and the second side edge 13. In this case, for example, when the second conveyor 20 is an unmanned transport vehicle, the movable range of the second conveyor 20 can be widened without interfering with the robot 30. In FIG. 1, the whole of the base portion 31 is positioned between the first side edge 12 and the second side edge 13, but a part of the base portion 31 may be positioned outside between the first side edge 12 and the second side edge 13.

When viewed from above, at least a portion of the base portion 31 may be positioned between the first position P1 and the second position P2 in a direction along the first line 14. The lengths of the first arm 33 and the second arm 34 can be further reduced.

When viewed from above, the second conveyor 20 may have a first side edge 21 and a second side edge 22 along the transport line 11, and at least a part of the base portion 31 may be positioned between the first side edge 21 and the second side edge 22. In this case, for example, when the first conveyor 10 is an unmanned transport vehicle, the range in which the first conveyor 10 can move can be widened without interfering with the robot 30.

The first side edge 12 of the first conveyor 10 is positioned between the second side edge 13 and the second conveyor 20, and the second side edge 22 of the second conveyor 20 is positioned between the first side edge 21 and the first conveyor 10. When viewed from above, at least part of the base portion 31 may be positioned between the first side edge 21 and the second side edge 13, at least part of the base portion 31 may be positioned between the second side edge 22 and the second side edge 13, and at least part of the base portion 31 may be positioned between the second side edge 22 and the first side edge 12.

At least a part of the arm base 32 may be positioned between the first side edge 12 and the second side edge 13. In this case, the movable range of the second conveyor 20 can be further widened without interfering with the robot 30. In FIG. 1, the entire arm base 32 is positioned between the first side edge 12 and the second side edge 13, but a part of the arm base 32 may be positioned outside between the first side edge 12 and the second side edge 13.

As shown in FIG. 2, the robot 30 further includes an lifting actuator 50, a first actuator 61, a second actuator 62, a third actuator 63, and a robot controller 100. The lifting actuator 50 is provided on the base portion 31 and lifts and lowers the arm base 32. For example, the lifting actuator 50 includes a linear actuator 51 such as a ball screw type or a wire type. The linear actuator 51 lifts and lowers the arm base 32 in response to the supply of electric power. The lifting actuator 50 may further include a gravity compensation part 52. The gravity compensation part 52 applies a force resisting the gravity of the scalar portion to the arm base 32 by a counterweight, hydraulic pressure, gas pressure, or the like. The gravity compensation part 52 can reduce energy consumption in the linear actuator 51.

The first actuator 61 is provided on the arm base 32, for example, and rotates the first arm 33 about the first axis 41. The first actuator 61 includes a motor 61$m$ and a reduction gear 61$g$. The motor 61$m$ generates rotational torque in response to supply of electric power. The reduction gear 61$g$ amplifies the rotational torque generated by the motor 61$m$ according to a predetermined reduction ratio, and transmits the amplified torque to the first arm 33. The arrangement position of the first actuator 61 is not limited to the arm base 32, and may be provided at any position of the robot 30 as long as the first arm 33 can be rotated around the first axis 41. For example, the first actuator 61 may be provided on the first arm 33. The first actuator 61 may be configured to transmit power from the motor 61$m$ to the reduction gear 61$g$ via a transmission element such as a gear and a timing belt. At least part of the first actuator 61 for example, the motor 61$m$ may be provided at a position away from the first axis 41.

The second actuator 62 is provided on the first arm 33, for example, and rotates the second arm 34 about the second axis 42. The second actuator 62 includes a motor 62$m$ and a reduction gear 62$g$. The motor 62$m$ generates rotational torque in response of electric power. The reduction gear 62$g$ amplifies the rotational torque generated by the motor 62$m$ in accordance with a predetermined reduction ratio and transmits the amplified torque to the second arm 34. The arrangement position of the second actuator 62 is not limited to the first arm 33, but may be provided at any position of the robot 30 as long as the second arm 34 can be rotated about the second axis 42. For example, the second actuator 62 may be provided on the second arm 34. The second actuator 62 may be configured to transmit power from the motor 62$m$ to the reduction gear 62$g$ via a transmission element such as a gear and a timing belt. At least part of the second actuator 62 for example, the motor 62$m$ may be provided at a position away from the second axis 42.

The third actuator 63 is provided on the second arm 34, for example, and rotates the arm tip portion 35 about the third axis 43. The third actuator 63 includes a motor 63$m$ and a reduction gear 63$g$. The motor 63$m$ generates rotational torque in response to supply of electric power. The reduction gear 63$g$ amplifies the rotational torque generated by the motor 63$m$ according to a predetermined reduction ratio, and transmits the amplified torque to the arm tip portion 35. The arrangement position of the third actuator 63 is not limited to the second arm 34, and may be provided at any position of the robot 30 as long as the arm tip portion 35 can be rotated about the third axis 43. For example, the third actuator 63 may be provided at the arm tip portion 35. The third actuator 63 may be configured to transmit power from the motor 63$m$ to the reduction gear 63$g$ via a transmission element such as a gear and a timing belt. Further, at least a part of the third actuator 63 e.g., the motor 63$m$ may be provided at a position e.g., 33 apart from the third axis 43.

The robot controller 100 controls the lifting actuator 50, the first actuator 61, the second actuator 62, and the third actuator 63. For example, a robot controller 100 calculates respective operation target values of an lifting actuator 50, a first actuator 61, a second actuator 62, and a third actuator 63 by inverse kinematics calculation based on the operation trajectory of a workpiece holding portion 36, which is predetermined for holding a workpiece W supported by a first conveyor 10, lifting the workpiece, conveying the workpiece W until it reaches a second position P2, lowering the workpiece and supporting the workpiece W by a second conveyor 20, and model information of a robot 30, and causes the operations of the lifting actuator 50, the first actuator 61, the second actuator 62, and the third actuator 63 to follow the operation target values.

The arm base 32 may extend from the fixed position P4 to the upper side of the first conveyor 10 toward the rear of the transport line 11. Thus, the first arm 33 and the second arm 34 can be further shortened. The arm base 32 may extend above the workpiece W conveyed to the first position P1 by the first conveyor 10. As shown in FIG. 2, the end of the arm base 32 may be positioned between the fixed position P4 and the first position P1 in the direction along the transport line 11. The arm base 32 may extend above the first position P1. For example, the end of the arm base 32 may be positioned behind the first position P1 in the transport line 11.

The first arm 33 may be mounted on the arm base 32, the second arm 34 may be mounted below the first arm 33 so as to be at least partially at the same height as the arm base 32, and the arm tip portion 35 may be mounted below the second arm 34. Thus, the height of the scalar portion can be reduced.

The vertical relationship among the arm base 32, the first arm 33, and the second arm 34 is not necessarily limited to the relationship illustrated in FIG. 2. For example, the arm base 32 may be attached under the first arm 33 and the second arm 34 may be attached under the first arm 33. In this case, since the interference between the arm base 32 and the second arm 34 is less likely to occur, the movable range of the second arm 34 can be increased.

Figure 3:
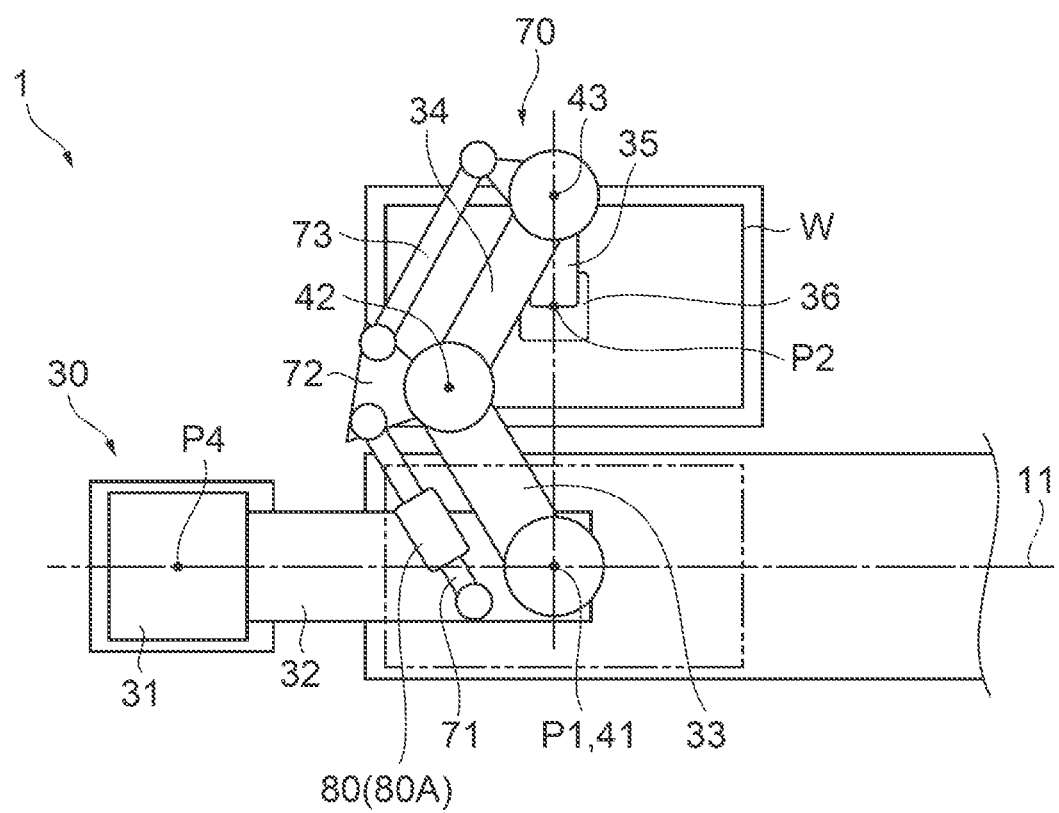
FIG. 3 is a plan view showing a variation of the robot system.

FIG. 3 is a plan view showing a modification of the robot system 1. As shown in FIG. 3, the robot 30 may further include a link 70 that links the rotation of the arm tip portion 35 about the third axis 43 to the rotation of the first arm 33 about the first axis 41 and the rotation of the second arm 34 about the second axis 42. In this case, the third actuator 63 is eliminated, and the weight of the scalar portion can be further reduced.

For example, the link 70 includes a relay rotor 72, a first link 71, and a second link 73. The relay rotor 72 is provided at a connecting portion between the first arm 33 and the second arm 34 so as to rotate about the second axis 42 with respect to both of the first arm 33 and the second arm 34.

The first link 71 synchronizes the rotation of the relay rotor 72 around the second axis 42 with the rotation of the first arm 33 around the first axis 41. For example, the first link 71 extends in parallel to the first arm 33. One end of the first link 71 is connected to the arm base 32 so as to rotate about a vertical axis, and the other end of the first link 71 is connected to the relay rotor 72 so as to rotate about a vertical axis. Thus, the first link 71 transmits the rotation of the first arm 33 around the first axis 41 to the relay rotor 72.

The second link 73 links the rotation of the arm tip portion 35 around the third axis 43 with the rotation of the relay rotor 72 around the second axis 42 and the rotation of the second arm 34 around the second axis 42. For example, the second link 73 extends in parallel to the second arm 34. One end of the second link 73 is connected to the relay rotor 72 so as to rotate about a vertical axis, and the other end of the second link 73 is connected to the arm tip portion 35 so as to rotate about a vertical axis. Thus, the second link 73 transmits the rotation transmitted from the first link 71 to the relay rotor 72 and the rotation of the second arm 34 around the second axis 42 to the arm tip portion 35.

In FIG. 3, the first arm 33 and the second arm 34 are folded in a direction in which they approach to the fixed position P4. For example, the connecting portion between the first arm 33 and the second arm 34 is positioned forward of the transport line 11 with respect to both the connecting portion between the arm base 32 and the first arm 33 and the connecting portion between the second arm 34 and the arm tip portion 35. The robot 30 may transport the workpiece W from the first position P1 to the second position P2 in a state in which the first arm 33 and the second arm 34 are folded as described above. For example, the robot controller 100 may operate the first actuator 61 and the second actuator 62 so as to convey the workpiece W from the first position P1 to the second position P2 in a state in which the first arm 33 and the second arm 34 are folded as described above.

Thus, in the process of conveying the workpiece W from the first position P1 to the second position P2, the size of the region occupied by the scalar P2 can be reduced. Further, by shifting the center of gravity of the scalar portion to the fixed position P4 side, the load for supporting the scalar portion can be reduced.

As shown in FIG. 3, the arm tip portion 35 may extend in a direction away from the third axis 43, and the workpiece holding portion 36 may be provided below the arm tip portion 35 at a position away from the third axis 43. The movable limit of the first arm 33 and the second arm 34, which is caused by the second arm 34 and the arm base 32 being positioned at the same height, can be compensated by the arm tip portion 35.

The link 70 may be configured such that the direction in which the arm tip portion 35 extends from the third axis 43 is along the direction from the second position P2 toward the first position P1. For example, in the state in which the first arm 33 and the second arm 34 are folded as described above, it is conceivable that the joint portion between the second arm 34 and the arm tip portion 35 cannot be sufficiently brought close to the first position P1 due to the interference between the arm base 32 and the second arm 34. Even in such a state, since the arm tip portion 35 extends toward the first position P1, the workpiece holding portion 36 can be easily disposed at the first position P1.

The robot 30 may further include a posture adjusting portion (an example of "a posture adjuster") 80 for adjusting the posture of the workpiece holding portion 36. For example, the posture adjusting portion 80 has a first posture adjusting portion 80A. The first posture adjusting portion 80A adjusts the posture of the arm tip portion 35 around the third axis 43 by changing the length of the link 70. According to the first posture adjusting portion 80A, a small and lightweight actuator can be employed to adjust the posture of the arm tip portion 35 around the third axis 43. The first posture adjusting portion 80A may be configured to adjust the posture of the arm tip portion 35 around the third axis 43 by changing the length of the first link 71. According to the configuration in which the length of the first link 71 is changed, the moment load acting on the first axis 41 can be reduced by the weight of the first posture adjusting portion 80A.

Figure 4:
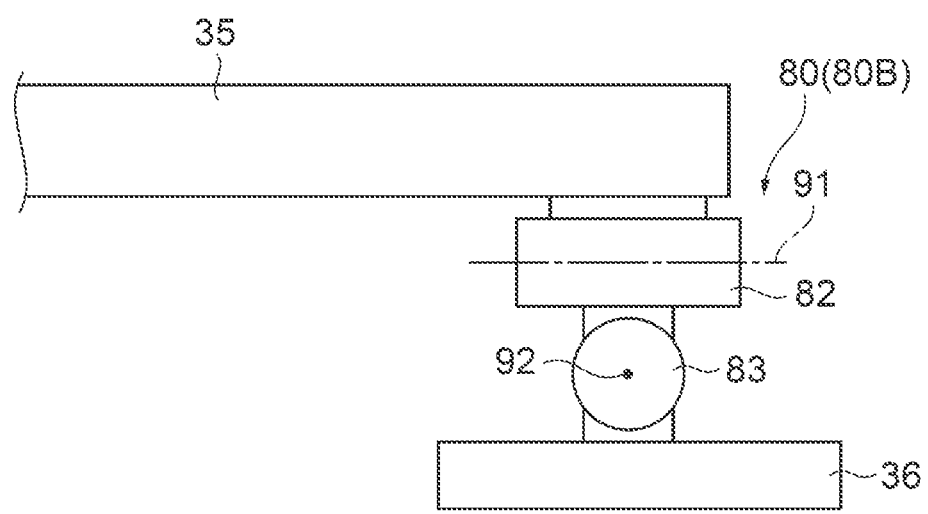
FIG. 4 is a schematic diagram illustrating a configuration of a posture adjusting portion.

The posture adjusting portion 80 may further include a second posture adjusting portion 80B shown in FIG. 4. The second posture adjusting portion 80B is provided between the arm tip portion 35 and the workpiece holding portion 36, and adjusts the posture of the workpiece holding portion 36 around an adjustment axis 91 intersecting in the vertical direction. According to the second posture adjusting portion 80B, the posture of the workpiece holding portion 36 can be adjusted appropriately in accordance with the deflection of the scalar portion or the like. As a result, it is possible to lower the requirement for the stiffness of the scalar portion and further reduce the weight of the scalar portion.

The second posture adjusting portion 80B may be configured to further adjust the posture of the workpiece holding portion 36 around the second adjustment axis 92 which intersects the vertical direction and the adjustment axis 91. Thus, the posture of the workpiece holding portion 36 can be adjusted more appropriately. It should be noted that the crossing includes a case of being twisted with each other, such as a so-called three dimensional crossing. The same applies to the following.

As an example, the posture adjusting portion 80 includes an adjusting actuator 82 and an adjusting actuator 83 arranged vertically between the arm tip portion 35 and the workpiece holding portion 36. The adjusting actuator 82 rotates the workpiece holding portion 36 around the horizontal adjustment axis 91 along the direction in which the arm tip portion 35 extends from the third axis 43 by the supply of electric power. The adjusting actuator 83 rotates the workpiece holding portion 36 about a horizontal second adjustment axis 92 which intersects e.g., is orthogonal to the adjustment axis 91 by the supply of electric power. The positional relationship between the adjusting actuator 82 and the adjusting actuator 83 is not limited. The adjusting actuator 82 and the adjusting actuator 83 may be provided at the same height as each other, or the adjusting actuator 83 may be provided above the adjusting actuator 82.

Figure 5:
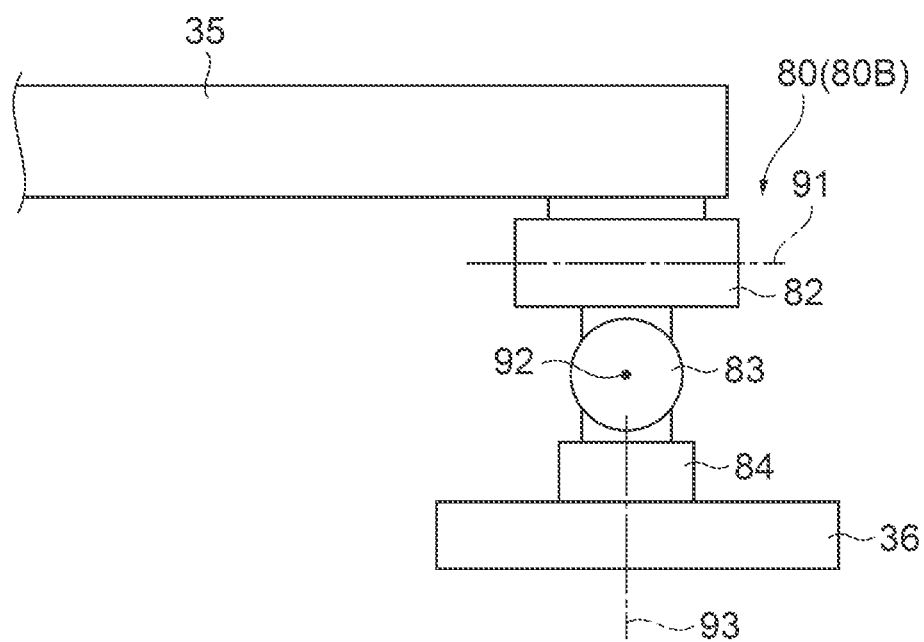
FIG. 5 is a schematic view showing a modification of the posture adjusting portion.

As shown in FIG. 5, the second posture adjusting portion 80B may be configured to further adjust the posture of the workpiece holding portion 36 around a third adjustment axis 93 intersecting the adjustment axis 91 and the second adjustment axis 92. Thus, the posture of the workpiece holding portion 36 can be adjusted more appropriately. For example, the second posture adjustment portion 80B may further include an adjusting actuator 84. The adjusting actuator 84 rotates the workpiece holding portion 36 about a third vertical adjustment axis 93. The adjusting actuator 84 may be provided at the same height as the adjusting actuator 82 and the adjusting actuator 83, may be provided above the adjusting actuator 82 and the adjusting actuator 83, or may be provided between the adjusting actuator 82 and the adjusting actuator 83.

When the second posture adjusting portion 80B adjusts the posture of the workpiece holding portion 36 around the third adjustment axis 93, even if the posture adjusting portion 80 does not have the first posture adjusting portion 80A, the posture of the workpiece holding portion 36 around the third adjustment axis 93 can be adjusted.

The movable angle of the workpiece holding portion 36 by the posture adjusting portion 80 may be within ±30°, within ±20°, or within ±10°. For example, the movable angle of the arm tip portion 35 by the telescopic actuator 81, the movable angle of the workpiece holding portion 36 by the adjusting actuator 82, the movable angle of the workpiece holding portion 36 by the adjusting actuator 83, and the movable angle of the workpiece holding portion 36 by the adjusting actuator 84 may be within ±30°, ±20°, or ±10°, respectively. In a state in which the workpiece holding portion 36 grips the workpiece W from above, a moment load due to the weight of the workpiece W hardly acts on the posture adjusting portion 80. For this reason, the movable angle of the posture adjusting portion 80, it is possible to reduce the size and weight of the posture adjusting portion 80.

[Summary] As described above, a robot system 1 includes a first conveyor 10 for conveying a workpiece to a first position P1 along a horizontal transport line 11, a second conveyor 20 for conveying a workpiece from a second position P2 adjacent to the first position P1 along a first line 14 perpendicular to the transport line 11, and a robot 30 fixed at a fixed position P4 apart from the first line 14 in the direction of conveying the workpiece W by the first conveyor 10 and conveying the workpiece from the first position P1 to the second position P2, wherein the robot 30 is provided with a base portion 31 fixed at the fixed position P4 and lifting and lowering an arm base 32, a first arm 33 connected to the arm base 32 so as to rotate around a vertical first axis 41 and extending in a direction away from the first axis 41, a second arm 34 connected to the first arm 33 so as to rotate around a vertical second axis 42 and extending in a direction away from the second axis 42, an arm tip portion 35 connected to the second arm 34 so as to rotate around a vertical third axis 43, and a workpiece holding portion 36 provided below the arm tip portion 35 and holding the workpiece from above.

In a robot 30 for transferring a workpiece from a transport device to a second conveyor 20, a portion from an arm base 32 to an arm tip portion 35 is a scalar type. Therefore, the moment due to gravity can be suppressed and the first arm 33, the second arm 34, and the arm tip portion 35 can be driven with high efficiency. Hereinafter, the portion from the arm base 32 to the arm tip portion 35 is referred to as a "scalar portion". According to the configuration in which the arm base 32 is lifted and lowered, it is not necessary to arrange an actuator for lifting and lowering in the first arm 33, the second arm 34, and the arm tip portion 35, so that the weight of the scalar portion can be reduced. Further, according to the configuration in which the arm base 32 is lifted and lowered without rotating, the region occupied by the scalar portion by the rotating operation can be reduced as compared with the configuration in which the entire scalar portion is rotated. Thus, the first arm 33, the second arm 34, and the arm tip portion 35 can be driven with higher efficiency. In addition, since the scalar portion is lifted and lowered together with the workpiece, the load for lifting and lowering becomes large, but the load for lifting and lowering can be appropriately reduced by utilizing gravity or gas pressure. With a configuration in which a workpiece is transported from a first position P1 to a second position P2 by a robot 30 fixed to a fixed position P4 separated from a first line 14 toward the transport direction of the workpiece W by a first conveyor 10, the transport stroke from the first position P1 to the second position P2 can be ensured while the lengths of the first arm 33 and the second arm 34 are kept short. Therefore, the first arm 33, the second arm 34, and the arm tip portion 35 can be driven at a higher efficiency. Therefore, it is effective for conveying the workpiece with high efficiency.

The robot 30 may further include an posture adjusting portion 80 which is provided between the arm tip portion 35 and the workpiece holding portion 36 and adjusts the posture of the workpiece holding portion 36 around an adjustment axis 91 crossing in the vertical direction. The posture of the workpiece holding portion 36 can be adjusted appropriately in accordance with the deflection of the scalar portion or the like. As a result, it is possible to decrease the requirement for the stiffness of the scalar portion and further reduce the weight of the scalar portion.

The posture adjusting portion 80 may further adjust the posture of the workpiece holding portion 36 around the second adjustment axis 92 which intersects the vertical direction and the adjustment axis 91. Thus, the posture of the workpiece holding portion 36 can be adjusted more appropriately.

The posture adjusting portion 80 may further adjust the posture of the workpiece holding portion 36 around the third adjustment axis 93 intersecting the adjustment axis 91 and the second adjustment axis 92. Thus, the posture of the workpiece holding portion 36 can be adjusted more appropriately.

The movable angle of the workpiece holding portion 36 by the posture adjusting portion 80 may be within ±30°. It is possible to reduce the size and weight of the posture adjusting portion 80.

The arm base 32 may extend from the fixed position P4 to an upper portion of the transport device. It is possible to further shorten the first arm 33 and the second arm 34.

The first arm 33 may be mounted on the arm base 32, the second arm 34 may be mounted below the first arm 33 so as to be at least partially at the same height as the arm base 32, and the arm tip portion 35 may be mounted below the second arm 34. The height of the scalar portion can be reduced.

The arm base 32 extends from the fixed position P4 toward the first position P1, and the robot 30 may transport the workpiece from the first position P1 to the second position P2 in a state in which the first arm 33 and the second arm 34 are folded in the direction in which they approach the fixed position P4. In the process of conveying a workpiece from a first position P1 to a second position P2, a region occupied by a scalar portion can be reduced. Further, by shifting the center of gravity of the scalar portion to the fixed position P4 side, the load for supporting the scalar portion can be reduced.

The arm tip portion 35 may extend in a direction away from the third axis 43, and the workpiece holding portion 36 may be provided below the arm tip portion 35 at a position away from the third axis 43. The movable limit of the first arm 33 and the second arm 34, which is caused by the second arm 34 and the arm base 32 being positioned at the same height, can be compensated by the arm tip portion 35.

When viewed from above, at least a part of the base portion 31 may be positioned between the first position P1 and the second position P2 in a direction along the first line 14. The lengths of the first arm 33 and the second arm 34 can be further reduced.

When viewed from above, the first conveyor 10 may have a first side edge 12 and a second side edge 13 along the transport line 11, and at least a part of the base portion 31 may be positioned between the first side edge 12 and the second side edge 13. The movable range of the second conveyor 20 can be widened.

The robot 30 may further include a link 70 that links the rotation of the arm tip portion 35 about the third axis 43 with the rotation of the first arm 33 about the first axis 41 and the rotation of the second arm 34 about the second axis 42. Further weight reduction of the scalar portion can be achieved.

The robot 30 may further include a posture adjusting portion 80 for adjusting the posture of the arm tip portion 35 around the third axis 43 by changing the length of the link 70. The posture of the arm tip portion 35 about the third axis 43 can be adjusted by a small and lightweight actuator.

A link 70 includes a first link 71 for transmitting the rotation of a first arm 33 about a first axis 41, and a second link 73 for transmitting the rotation transmitted from the first link 71 and the rotation of a second arm 34 about a second axis 42 to an arm tip portion 35, and an posture adjusting portion 80 may adjust the posture of the arm tip portion 35 about a third axis 43 by changing the length of the first link 71. A moment load acting on the first axis 41 can be reduced by the weight of the posture adjusting portion 80.

The arm base 32 extends from the fixed position P4 toward the first position P1, and the robot 30 may transport the workpiece from the first position P1 to the second position P2 in a state in which the first arm 33 and the second arm 34 are folded in the direction in which they approach the fixed position P4. In the process of conveying a workpiece from a first position P1 to a second position P2, a region occupied by a scalar portion can be reduced. Further, by shifting the center of gravity of the scalar portion to the fixed position P4 side, the load for supporting the scalar portion can be reduced.

The arm tip portion 35 may extend in a direction away from the third axis 43, the workpiece holding portion 36 may be provided below the arm tip portion 35 at a position away from the third axis 43, and the link 70 may make the direction in which the arm tip portion 35 extends from the third axis 43 along the direction from the second position P2 toward the first position P1. With the first arm 33 and the second arm 34 folded, the workpiece holding portion 36 can be easily arranged at the first position P1.

Figure 6:
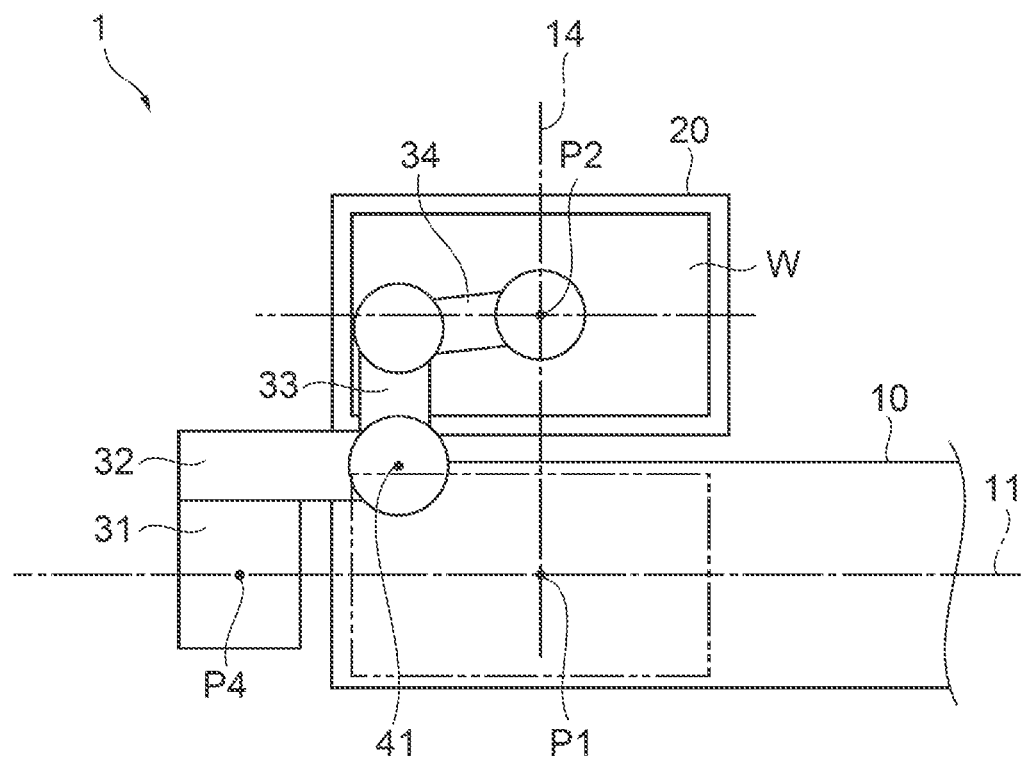
FIG. 6 is a plan view showing another modification of the robot system.

As shown in FIG. 6, the first axis 41 may be positioned between the first position P1 and the second position P2 in the direction along the first line 14. The lengths of the first arm 33 and the second arm 34 can be further reduced.

In the direction along the first line 14, the first axis 41 may be positioned between the fixed position P4 and the second position P2. In this case, the length of the first arm 33 and the second arm 34 can be kept short while the movable range of the second conveyor 20 can be widened.

Figure 7:
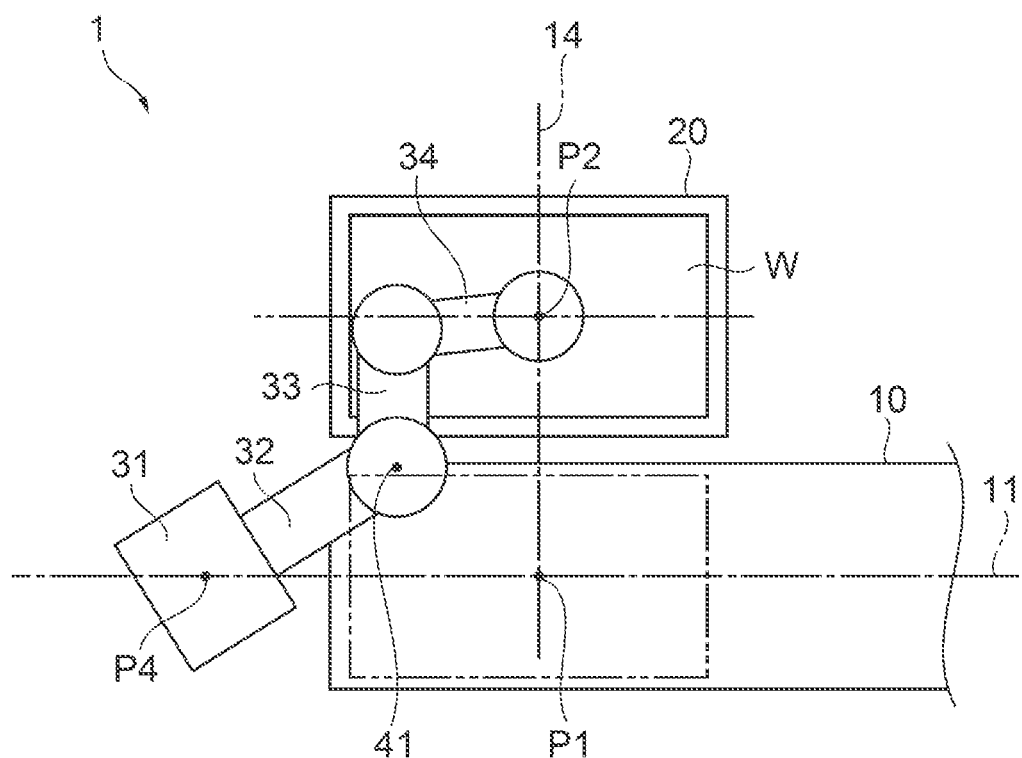
FIG. 7 is a plan view illustrating yet another modification of the robot system.

As shown in FIG. 7, the arm base 32 may extend from the fixed position P4 toward between the first position P1 and the second position P2 along a line inclined with respect to the transport line 11. The length of the first arm 33 and the second arm 34 can be reduced, and the movable range of the second conveyor 20 can be widened.

The portable weight of the robot 30 may be equal to or greater than 300 kg. High-efficiency transportation is more beneficial.

The workpiece may include a battery module for running an electric vehicle. High-efficiency transportation is more beneficial.

Although the embodiments have been described above, the present disclosure is not necessarily limited to the above-described embodiments, and various modifications can be made without departing from the gist thereof.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A robot system comprising:
   a first conveyor configured to convey a workpiece along a transport line in a conveying direction to a first position;
   a second conveyor configured to convey the workpiece from a second position along a first line, the first line being perpendicular to the transport line; and
   a robot configured to convey the workpiece from the first position to the second position, the robot comprising:
   a base fixed at a fixed position, the fixed position being spaced apart from the first conveyor in the conveying direction, the transport line extending in the conveying direction along an axis that intersects with the fixed position when viewed from above;
   an arm base movably connected to the base to move upwards and downwards along the base;
   a first arm having a first one end portion and a first another end portion opposite to the first one end portion, the first one end portion being connected to the arm base rotatably about a first axis perpendicular to the transport line and the first line;

a second arm having a second one end portion and a second another end portion opposite to the second one end portion, the second one end portion being connected to the first another end portion rotatably about a second axis parallel to the first axis;

an arm tip connected to the second another end portion rotatably about a third axis parallel to the first axis; and a workpiece holder provided below the arm tip and configured to hold the workpiece from above, wherein the first axis overlaps with the first conveyor when viewed from above, and wherein the first axis is located between the fixed position and the first position.

2. The robot system according to claim 1, wherein the robot further comprises a posture adjuster which is provided between the arm tip and the workpiece holder and which is configured to adjust a posture of the workpiece holder to rotate around an adjustment axis intersecting in the vertical direction.

3. The robot system according to claim 2, wherein the posture adjuster is configured to adjust the posture of the workpiece holder to rotate around a second adjustment axis which intersects the vertical direction and the adjustment axis.

4. The robot system according to claim 3, wherein the posture adjuster is configured to adjust the posture of the workpiece holder to rotate around a third adjustment axis which intersects the adjustment axis and the second adjustment axis.

5. The robot system according to claim 2, wherein a movable angle of the workpiece holder by the posture adjuster is within ±30°.

6. The robot system according to claim 1,
wherein the first arm is mounted on the arm base,
wherein the second arm is mounted below the first arm so as to be at least partially flush with the arm base, and
wherein the arm tip is mounted below the second arm.

7. The robot system according to claim 6,
wherein the arm base is elongated in a direction that extends from the fixed position toward the first position, and
wherein the robot is configured to convey the workpiece from the first position to the second position in a state in which the first arm and the second arm are folded in a direction in which they approach the fixed position.

8. The robot system according to claim 6,
wherein the arm tip extends in a direction away from the third axis, and
wherein the workpiece holder is provided below the arm tip at a position away from the third axis.

9. The robot system according to claim 1,
wherein the first conveyor includes a first side edge and a second side edge that each extend in the conveying direction along the transport line, and
wherein, when viewed in the conveying direction along the axis that intersects with the fixed position, at least a part of the base is positioned between the first side edge and the second side edge.

10. The robot system according to claim 1, wherein the robot comprises a link configured to link rotation of the arm tip about the third axis and rotation of the first arm about the first axis and of the second arm about the second axis.

11. The robot system according to claim 10, wherein the robot comprises a posture adjuster configured to adjust a posture of the arm tip around the third axis by changing the length of the link.

12. The robot system according to claim 11, wherein the link comprises
a second link, and
a first link configured to transmit the rotation of the first arm to the second link,
wherein the second link is configured to transmit to the arm tip the rotation of the second arm and transmitted rotation of the first arm from the first link, and
wherein the posture adjuster is configured to adjust the posture of the arm tip around the third axis by changing a length of the first link.

13. The robot system according to claim 10,
wherein the arm base extends from the fixed position toward the first position, and
wherein the robot is configured to convey the workpiece from the first position to the second position in a state in which the first arm and the second arm are folded in a direction in which they approach the fixed position.

14. The robot system according to claim 13,
wherein the arm tip extends in a direction away from the third axis,
wherein the workpiece holder is provided below the arm tip at a position apart from the third axis, and
wherein the link causes the direction in which the arm tip extends from the third axis to follow the direction from the second position toward the first position.

15. The robot system according to claim 1, wherein the workpiece includes a battery module for running an electric vehicle.

16. The robot system according to claim 1, wherein the second position is provided adjacent to the first position.

17. The robot system according to claim 1, wherein the transport line is horizontal.

18. The robot system according to claim 1, wherein the first axis is vertical.

19. A robot system 1 comprising:
a first conveyor configured to convey a workpiece along a transport line in a conveying direction to a first position;
a second conveyor configured to convey the workpiece from a second position along a first line, the first line being perpendicular to the transport line; and
a robot configured to convey the workpiece from the first position to the second position, the robot comprising:
a base fixed at a fixed position, the fixed position being spaced apart from the first conveyor in the conveying direction, the transport line extending in the conveying direction along an axis that intersects with the fixed position when viewed from above;
an arm base movably connected to the base to move upwards and downwards along the base;
a first arm having a first one end portion and a first another end portion opposite to the first one end portion, the first one end portion being connected to the arm base rotatably about a first axis perpendicular to the transport line and the first line;
a second arm having a second one end portion and a second another end portion opposite to the second one end portion, the second one end portion being connected to the first another end portion rotatably about a second axis parallel to the first axis;
an arm tip connected to the second another end portion rotatably about a third axis parallel to the first axis; and
a workpiece holder provided below the arm tip and configured to hold the workpiece from above, wherein, when viewed in the conveying direction along the axis that intersects with the fixed position, at least a part of the base is positioned between the first position and the second position in a direction along the first line.

20. A robot system comprising:
a first conveyor configured to convey a workpiece along a transport line in a conveying direction to a first position;
a second conveyor configured to convey the workpiece from a second position along a first line, the first line being perpendicular to the transport line; and
a robot configured to convey the workpiece from the first position to the second position, the robot comprising:
a base fixed at a fixed position, the fixed position being spaced apart from the first conveyor in the conveying direction, the transport line extending in the conveying direction along an axis that intersects with the fixed position when viewed from above;
an arm base movably connected to the base to move upwards and downwards along the base;
a first arm having a first one end portion and a first another end portion opposite to the first one end portion, the first one end portion being connected to the arm base rotatably about a first axis perpendicular to the transport line and the first line;
a second arm having a second one end portion and a second another end portion opposite to the second one end portion, the second one end portion being connected to the first another end portion rotatably about a second axis parallel to the first axis;
an arm tip connected to the second another end portion rotatably about a third axis parallel to the first axis; and
a workpiece holder provided below the arm tip and configured to hold the workpiece from above,
wherein, when viewed in the conveying direction along the axis that intersects with the fixed position, the first axis is positioned between the first position and the second position in the direction along the first line.

21. The robot system according to claim 20, wherein, when viewed in the conveying direction along the axis that intersects with the fixed position, the first axis is positioned between the fixed position and the second position in the direction along the first line.

22. The robot system according to claim 21, wherein the arm base extends from the fixed position toward between the first position and the second position along a second line inclined with respect to the transport line.

* * * * *